(12) United States Patent
Dorward et al.

(10) Patent No.: US 6,912,645 B2
(45) Date of Patent: Jun. 28, 2005

(54) METHOD AND APPARATUS FOR ARCHIVAL DATA STORAGE

(75) Inventors: Sean Matthew Dorward, Martinsville, NJ (US); Sean Quinlan, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 381 days.

(21) Appl. No.: 10/198,185

(22) Filed: Jul. 18, 2002

(65) Prior Publication Data

US 2003/0018878 A1 Jan. 23, 2003

Related U.S. Application Data

(60) Provisional application No. 60/306,564, filed on Jul. 19, 2001.

(51) Int. Cl.$^7$ .............................................. G06F 12/00
(52) U.S. Cl. ........................ 711/216; 711/118; 711/161; 711/220; 707/1
(58) Field of Search ................................ 711/216, 118, 711/161, 220; 707/1

(56) References Cited

U.S. PATENT DOCUMENTS 6,131,096 A * 10/2000 Ng et al. ........................ 707/10
6,708,221 B1 * 3/2004 Mendez et al. ............. 709/248

OTHER PUBLICATIONS

A. Chervenak et al., "Protecting file systems: A survey of backup techniques," Proceedings Joint NASA and IEEE Mass Storage Conference, 15 pages, Mar. 1998.
A. Crespo et al., "Archival storage for digital libraries," Proceedings of the 3rd ACM International Conference on Digital Libraries, 10 pages, 1998.
K. Fu et al., "Fast and secure distributed read–only file system," Proceedings of the 4th Symposium on Operating Systems Design and Implementation, 16 pages, 2000.
T. J. Gibson et al., "Long–term file activity and inter–reference patterns," Proceedings of 24th International Conference on Technology Management and Performance Evaluation of Enterprise–Wide Information Systems, Computer Measurement Group, pp. 1–21, Dec. 1998.
D. Hitz et al., "File System Design for an NFS File Server Appliance," Proceedings of the Winter 1994 USENIX Conference, San Francisco, CA, pp. 1–23, Jan. 1994.
J.K. Hollingsworth et al., "Using content–derived names for configuration management," Proceedings of the 1997 ACM Symposium on Software Reusability, Boston, MA, pp. 1–6, May 1997.
N.C. Hutchinson et al., "Logical vs. physical file system backup," Proceedings of the 3rd USENIX Symposium on Operating Systems Design and Implementation (OSDI), 12 pages, 1999.

(Continued)

Primary Examiner—Stephen Elmore

(57) ABSTRACT

Data storage techniques particularly well-suited for use in archival data storage are disclosed. In one aspect of the invention, a data block is processed to generate an address as a function of the contents of the data block, and the data block is then stored in the system in a memory location identified by the address. The processing operation is configured to provide write-once archival storage of the data block, in that the contents of the data block are not modifiable without also altering the address of the data block determinable in the processing operation. In an illustrative embodiment, the processing of the data block involves determining a substantially unique identifier of the data block by applying a collision-resistant hash function to the contents of the data block, and the address is subsequently determined from the substantially unique identifier by utilizing the identifier to perform a lookup of the address in an index.

20 Claims, 3 Drawing Sheets

OTHER PUBLICATIONS

U. Manber, "Finding similar files in a large file system," Proceedings of the Winter 1994 USENIX Conference, San Francisco, CA, pp. 1–10, Jan. 1994.

A.J. Menezes et al., Handbook of Applied Cryptography, CRC Press, pp. 556–559, 1997.

A. Muthitacharoen et al., "A low–bandwidth network file system," Proceedings of the 18th Symposium on Operating Systems Principles, pp. 1–14, Oct. 2001.

FIPS 180–1, Secure Hash Standard, U.S. Department of Commerce, pp. 1–21, Apr. 1995.

R. Pike et al., "Plan 9 from Bell Labs," Computing Systems, vol. 8, No. 3, pp. 1–22, Summer 1995.

S. Quinlan, "A cached WORM file system," Software–Practice and Experience, vol. 21, 12, pp. 1–11, Dec. 1991.

D.S. Santry et al., "Deciding when to forget in the Elephant file system," Proceedings of the 17th Symposium on Operating Systems Principles, pp. 110–123, Dec. 12–15, 1999.

J.D. Strunk et al., "Self–securing storage: protecting data in compromised systems," Proceedings of the 4th Symposium on Operating Systems Design and Implementation, 15 pages, Oct. 2000.

D. A. Thompson et al., "The future of magnetic data storage technology," IBM Journal of Research and Development, vol. 44, No. 3, pp. 311–322, May 2000.

* cited by examiner

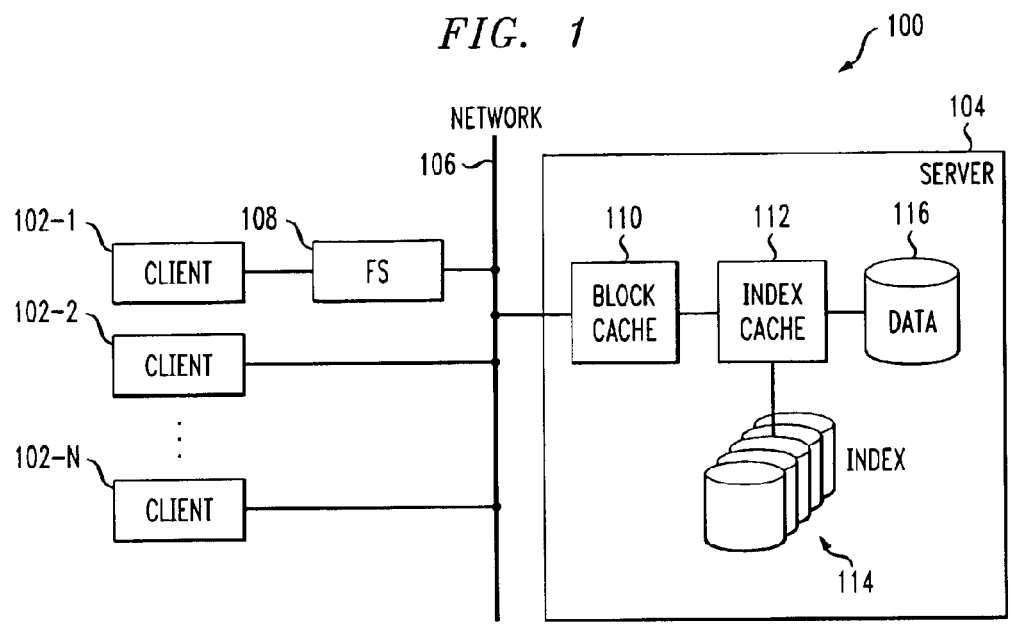
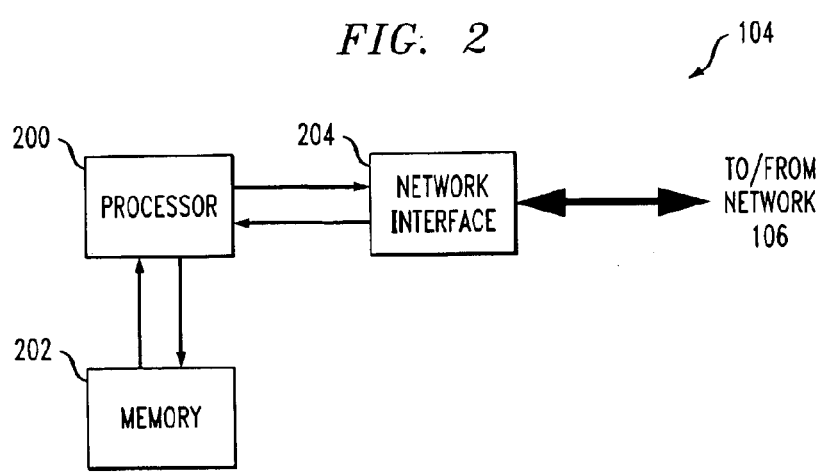

METHOD AND APPARATUS FOR ARCHIVAL DATA STORAGE

RELATED APPLICATION(S)

The present application claims the priority of U.S. Provisional Patent Application Ser. No. 60/306,564, filed Jul. 19, 2001 and entitled "Method and Apparatus for Archival Data Storage," the disclosure of which is hereby incorporated by reference herein.

FIELD OF THE INVENTION

The present invention relates generally to data storage techniques, and more particularly to data storage techniques that are suitable for use in managing archival data in a network storage system.

BACKGROUND OF THE INVENTION

The term "archival data" as used herein refers generally to file backups or other types of non-primary information storage in a designated long-term storage system. Conventional archival data storage typically involves the regular backup of data from a computer or other client machine to an optical jukebox, redundant array of inexpensive disks (RAID) device, magnetic tape drive or other device in a long-term storage system.

A typical scenario involves providing backup as a central service for a number of client machines. Client software interfaces with a file system or database and determines what data to back up. The data is copied from the client to a storage device, often over a network, and a record of what was copied is stored in a catalog database.

A more particular example of archival data storage of the type noted above is the file system in the computer environment known as Plan 9, as described in R. Pike et al., "Plan 9 from Bell Labs," Computing Systems, Vol. 8, No. 3, pp. 221–254, Summer 1995, which is incorporated by reference herein. The Plan 9 file system stores archival data to an optical jukebox. The archival data is stored in the form of a "snapshot," that is, a consistent read-only view of the file system at some point in the past. The snapshot retains the file system permissions and can be accessed using standard tools, and thus without special privileges or assistance from an administrator. Snapshots avoid the tradeoff between full and incremental backups. Each snapshot is a complete file system tree, much like a full backup. The implementation, however, resembles an incremental backup because the snapshots and the active file system share any blocks that remain unmodified. A snapshot only requires additional storage for the blocks that have changed. To achieve reasonable performance, the device that stores the snapshots must efficiently support random access, limiting the suitability of tape storage for this approach.

Other known archival data storage systems include the Elephant file system, described in D. S. Santry et al., "Deciding when to forget in the Elephant file system," Proceedings of the 17th Symposium on Operating Systems Principles, Dec. 12–15, 1999, and the Stanford Archival Vault, described in A. Crespo and H. Garcia-Molina, "Archival storage for digital libraries," Proceedings of the 3rd ACM International Conference on Digital Libraries, 1998, both papers being hereby incorporated by reference herein.

Recent substantial increases in the capacity of various storage technologies are making it practical to archive data in perpetuity. However, conventional techniques such as those described above are generally not optimized for providing this type of storage. A need therefore exists for improved archival data storage techniques which better exploit the expected ongoing growth in available storage capacity.

SUMMARY OF THE INVENTION

The present invention provides data storage methods and apparatus that are particularly well-suited for use in storing data in perpetuity in archival data storage applications, but also suitable for use in other applications, including primary storage applications.

In accordance with one aspect of the invention, a data block is processed to generate an address as a function of the contents of the data block, and the data block is then stored in the system in a memory location identified by the address. This approach provides write-once storage of the data block, in that the contents of the data block are not modifiable without also altering the address of the data block determinable from the above-noted processing operation.

As an example, in an illustrative embodiment of the invention, the processing of the data block involves determining a fingerprint or other substantially unique identifier of the data block by applying a collision-resistant hash function to the contents of the data block. The address is subsequently determined from the substantially unique identifier by utilizing the identifier to perform a lookup of the address in an index.

Advantageously, the data storage techniques of the present invention better exploit expected increases in the capacity of archival storage devices than the conventional techniques described previously.

BRIEF DESCRIPTION OF THE DRAWINGS

FIG. 1 shows an exemplary network storage system configured in accordance with the techniques of the invention.

FIG. 2 shows one possible implementation of a server or other processing device in the FIG. 1 network storage system.

DETAILED DESCRIPTION OF THE INVENTION

Figure 3:
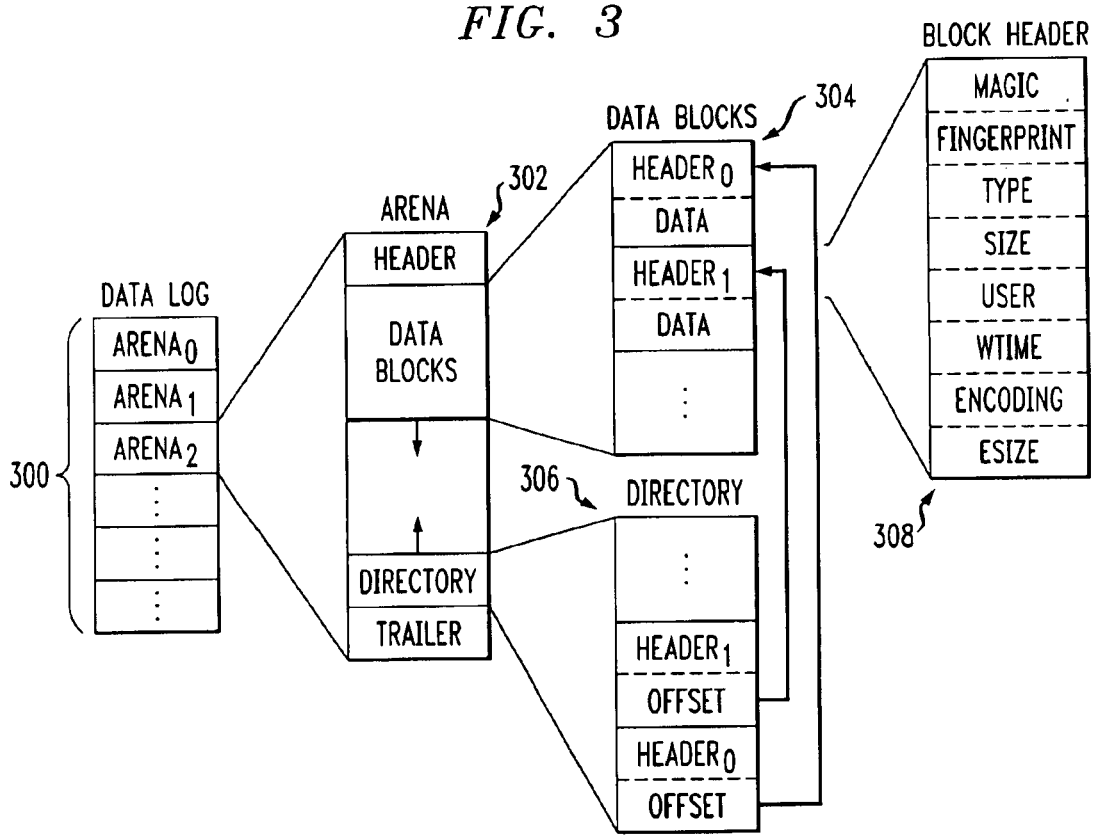
FIGS. 3 and 4 show example formats of a data log and index, respectively, as implemented in a server of the FIG. 1 network storage system in accordance with the techniques of the invention.

The present invention will be illustrated below in conjunction with an exemplary network storage system. It should be understood, however, that the invention is not limited to use with any particular type of storage system or storage system configuration, but is instead more generally applicable to any data storage application in which it is desirable to provide improved efficiency for storage and retrieval of data blocks. Moreover, although illustrated below in the context of archival data storage, the invention can also be used in primary storage applications.

FIG. 1 shows a network storage system 100 which implements an archival data storage technique in accordance with an illustrative embodiment of the invention. The system 100 includes a number of clients 102-1, 102-2, ... 102-N each coupled to a data storage server 104 via a network 106. A number of the clients are coupled directly to the network 106, while one of the clients, namely, client 102-1, is coupled to the network 106 via a file server (FS) device 108. The server 104 includes a block cache 110, an index cache 112 coupled to an index 114, and a data storage element 116.

The clients 102-i, i=1, 2, ... N, may be implemented as laptop or desktop personal computers (PCs), wireless telephones, personal digital assistants (PDAs) or other data processing devices, in any combination. The server 104 is preferably implemented as a computer or set of computers and associated memory devices, although other data processing devices could be used. Similarly, the file server 108 is preferably implemented as one or more computers.

Although referred to as a server in the illustrative embodiment, element 104 need not be implemented as a server in other embodiments. The invention does not require the client-server structure shown in FIG. 1, and element 104 can be implemented using a non-server processing device. Moreover, as indicated above, element 104 can be implemented in a distributed manner, for example, as a set of computers in the form of a server farm or cluster. The term "server" as used herein is intended to include such distributed arrangements.

The network 106 may be a local area network (LAN), a metropolitan area network (MAN), a wide area network (WAN), a global data communications network such as the Internet, a private "intranet" or "extranet" network or any other suitable data communication medium, as well as portions or combinations thereof.

The data storage element 116 of the server 104 operates in conjunction with the block cache 110, index cache 112 and index 114 to store archival data using the techniques of the present invention, as will be described in greater detail below. Although shown as a single element for simplicity of illustration, the data storage element 116 may be a distributed storage element comprising multiple distinct storage devices, and may comprise, by way of example and not limitation, one or more optical jukeboxes, RAID devices, magnetic tape drives or other long-term storage devices, in any combination.

In certain applications, it may be preferable to use RAID devices based on magnetic disks as the primary storage technology within data storage element 116, such that the performance of the system approaches that of a non-archival storage system. Such devices typically cost less than the equivalent capacity optical jukebox and occupy less physical space.

Additional details regarding known magnetic data storage devices can be found in, for example, D. A. Thompson and J. S. Best, "The future of magnetic data storage technology," IBM Journal of Research and Development, Vol. 44, No. 3, pp. 311–322, May 2000, which is incorporated by reference herein. It should be emphasized that the invention does not require any particular configuration of storage devices.

Other conventional aspects of certain data storage elements and systems suitable for use in conjunction with the present invention may be found in, e.g., A. Silberschatz, H. F. Korth and S. Sudarshan, "Database System Concepts," $3^{rd}$ edition, McGraw-Hill, 1997, which is incorporated by reference herein.

FIG. 2 is a simplified block diagram of one possible implementation of the server 104. In this implementation, the server 104 includes a processor 200 coupled to a memory 202 and to a network interface 204. The memory 202 may comprise elements 110, 112, 114 and 116 of the server 104, and may be distributed over multiple distinct storage devices. Moreover, memory 202 stores one or more software programs which are executable by the processor 200 in conjunction with provision of the archival data storage techniques described herein. The processor 200 may be a single processor, or may represent multiple processors distributed across multiple processing devices within the server 104.

The server 104 in accordance with the techniques of the invention is configured to provide a write-once archival repository that can be shared by multiple client machines and applications. The write-once policy imposed by the server 104 provides a number of advantages. For example, such a policy prohibits either a user or administrator from deleting or modifying data once it is stored. This greatly reduces the opportunities for accidental or malicious data loss and simplifies system implementation. Of course, some data is temporary, derivative, or so large that it is either undesirable or impractical to retain in perpetuity. However, in accordance with the techniques of the invention, once a decision has been made that the data is worth keeping and the data is stored in the server 104, it is assumed that the resources needed to store the data have been consumed and cannot be reclaimed. This eliminates the task of periodically "cleaning up" and deciding whether the data is still worth keeping. More thought is required before storing the data to a write-once archival server in accordance with the invention, but as the cost of storage continues to fall, this becomes an easy decision.

A basic assumption in the configuration of the server 104 is thus that the growth in capacity of magnetic disks or other memory storage devices combined with the removal of duplicate blocks and compression of their contents enables a model in which it is not necessary to reclaim space by deleting archival data.

It should be noted that the above assumptions, as well as other assumptions made in the present description, are for purposes of illustration only, and such assumptions should not be construed as limitations of the invention.

The server 104 may interface with the clients 102-i using a simple protocol that enables client applications to read and write variable sized blocks of data. The server 104 in this embodiment does not itself provide the services of a file or backup system, but rather the backend archival storage for these types of applications.

In addition, the server 104 in the illustrative embodiment identifies particular data blocks by a hash of their contents. By using a collision-resistant hash function with a sufficiently large output, it is possible to consider the hash of a data block as substantially unique. Such a substantially unique hash is an example of what is more generally referred to herein as a "fingerprint" or substantially unique identifier of a block, and in accordance with the invention may be used to determine the block address for read and write operations.

This approach provides the network storage system 100 with a number of desirable features. For example, since blocks are addressed based on the fingerprint of their contents, a block cannot be modified without changing its address. This provides the above-noted write-once policy in a particularly efficient manner. In conventional storage systems, by way of contrast, the address of a block and its contents are typically independent.

Another desirable feature is that writes in the server 104 are idempotent, that is, multiple writes of the same data will produce the same fingerprint and thus the same block address. The multiple writes can therefore be combined into a single write and do not require additional storage space beyond that required for the single write. This property can greatly increase the effective storage capacity of the server since it does not rely on the behavior of client applications. For example, an incremental backup application running on one of the clients 102-$i$ may not be able to determine exactly which blocks have changed, resulting in unnecessary duplication of data. In the system 100 of FIG. 1, such duplicate blocks will be discarded by the server 104 and only one copy of the data will be retained.

In the above-described system, replacing an incremental backup with a full backup will not increase the amount of storage required. Even duplicate data from different applications and client machines can be eliminated if the clients write the data using the same block size and alignment. The hash function can thus be viewed as generating a universal name space for data blocks. Without cooperating or coordinating, multiple clients can share this name space and share the data storage server 104. Moreover, the block level interface places few restrictions on the structures and format that clients use to store their data. In contrast, conventional backup and archival systems generally require more centralized control. For example, many conventional backup systems typically include some form of job scheduler in order to serialize access to multiple storage media, and may only support a small number of predetermined data formats so that the catalog system can extract pertinent meta-data.

When a previously-stored data block is to be retrieved from the server 104, both the requesting client 102-$i$ and the server can compute the fingerprint of the requested data and compare it to the requested fingerprint. Advantageously, this operation allows the client to avoid errors from undetected data corruption and enables the server to identify when error recovery is necessary.

Using the fingerprint of a block as its identity facilitates features such as replication, caching, and load balancing. Since the contents of a particular block are immutable, the problem of data coherency is greatly reduced. For example, a cache or a mirror cannot contain a stale or out of date version of a block.

As noted above, the illustrative embodiment of the invention utilizes a hash function that generates a unique fingerprint for every data block that a client may want to store. Clearly, if the size of the fingerprint is smaller than the size of the data blocks, such a hash function cannot exist since there are fewer possible fingerprints than blocks. If the fingerprint is large enough and randomly distributed, this problem does not arise in practice. For a server of a given capacity, the likelihood that two different blocks will have the same hash value, also known as a collision, can be determined. If the probability of a collision is vanishingly small, one can be confident that each fingerprint is substantially unique.

An example of a type of collision-resistant hash function suitable for use with the present invention is a cryptographic hash function for which it is computationally infeasible to find two distinct inputs that hash to the same value. See, for example, the hash functions described in A. J. Menezes, Handbook of Applied Cryptography, CRC Press, 1997, which is incorporated by reference herein. This property is important because it prevents a malicious client from intentionally creating blocks that violate the assumption that each block has a unique fingerprint. As an additional benefit, using a cryptographic hash function strengthens client integrity checks, preventing a malicious server from fulfilling a read request with fraudulent data. If the fingerprint of the returned block matches the requested fingerprint, the client can be confident the server returned the original data.

A more particular example of a cryptographic hash function suitable for use with the present invention is the well-known SHA-1 hash function developed by the National Institute for Standards and Technology (NIST), described in FIPS 180-1, Secure Hash Standard, U.S. Department of Commerce, April 1995, which is incorporated by reference herein. The output of the SHA-1 hash function is a 160 bit (20 byte) hash value. Software implementations of SHA-1 are relatively efficient, for example, a 700 Mhz Pentium® III processor can compute the SHA-1 hash of an 8 Kbyte data block in about 130 microseconds, a rate of 60 Mbytes per second. In addition, the 160 bit hash values generated by SHA-1 are large enough to ensure that the fingerprint of every block is substantially unique. More particularly, assuming random hash values with a uniform distribution, a collection of n different data blocks and a hash function that generates b bits, the probability p that there will be one or more collisions is bounded by the number of pairs of blocks multiplied by the probability that a given pair will collide:

$$p \leq \frac{n(n-1)}{2} \times \frac{1}{2^b}.$$

Current storage systems may contain a petabyte of data, that is, $10^{15}$ bytes of data. Consider an even larger system that contains an exabyte of data, that is, $10^{18}$ bytes, stored as 8 Kbyte blocks, for a total of approximately $10^{14}$ data blocks. Using the SHA-1 hash function, the probability of a collision is less than $10^{-20}$. The SHA-1 hash function can thus be viewed as providing a substantially unique identifier for a given data block. As storage technology advances, it may become feasible to store much more than an exabyte, at which point it maybe necessary to move to a larger hash function. NIST has already proposed variants of SHA-1 that produce 256, 384 and 512 bit results, as described in Draft FIPS 180-2, Secure Hash Standard, U.S. Department of Commerce, May 2001, which is incorporated by reference herein. It is to be appreciated, however, that the invention does not require the use of any particular hash function or other one-way function, and based on the teachings provided herein those skilled in the art will be readily able to determine an appropriate function for a given application.

An example implementation of the server 104 in system 100 of FIG. 1 will now be described in detail with reference to FIGS. 3 and 4. This implementation uses an append-only log of data blocks and an index that maps fingerprints to locations in this log. It also includes a number of features that improve robustness and performance.

In the example implementation of the server 104, the storage of data blocks is separated from the index used to locate the blocks, as is also apparent from FIG. 1. More particularly, blocks are stored in an append-only log on storage element 116, the storage element being in the form of a RAID array of magnetic disk drives. The simplicity of the append-only log structure eliminates many possible software errors that might cause data corruption and facilitates a variety of additional integrity strategies. A separate index storage structure comprising elements 112 and 114 in FIG. 1 allows a given data block to be efficiently located in the log. The index can be regenerated from the data log if required and thus does not have the same reliability constraints as the log itself.

FIG. 3 shows the structure of the above-noted data log as stored in storage element 116 of server 104. The data log 300 is divided into self-contained sections, denoted $arena_0$, $arena_1$, $arena_2$, etc. Each arena contains a large number of data blocks and is sized to facilitate operations such as copying to removable media. Within a given arena 302 is a section for data blocks 304 that is filled in an append-only manner.

Also, in the example implementation of the server 104, data blocks are of variable size, up to a current limit of 52 Kbytes, but since blocks are immutable they can be densely packed into an arena without fragmentation. Each data block is prefixed by a header, denoted $header_0$, $header_1$, etc., that describes the contents of the corresponding block. The primary purpose of the block header is to provide integrity checking during normal operation and to assist in data recovery.

In addition to a log of data blocks, arena 302 includes a header, a directory, and a trailer. The arena header identifies the particular arena. The directory 306 contains a copy of the block header and offset for every block in the arena. By replicating the headers of all the blocks in one relatively small part of the arena, the server 104 can rapidly check or rebuild the global block index of the system. The directory 306 also facilitates error recovery if part of the arena is destroyed or corrupted. The trailer summarizes the current state of the arena itself, including the number of blocks and the size of the log. Within the arena, the data log and the directory start at opposite ends and grow towards each other. When the arena is filled, it is marked as sealed, and a fingerprint is computed for the contents of the entire arena. Sealed arenas are never modified.

A given block header 308 includes a "magic" number, the fingerprint of the data block, a user-supplied type identifier, the size of the data block, the identity of the client device or other user that wrote the data block, and the time when the block was first written, the latter being denoted "wtime." Note that in the illustrative embodiment only one copy of a given data block is stored in the data log 300. The user and wtime fields thus correspond to those associated with the first time the block was stored to the server.

The term "user" in the present description may refer to the particular client device requesting storage of the data block, or a particular person or other entity associated with that client device, or both.

The magic number referred to above is generally implemented as a predetermined constant, and may be used to provide a quick check that the data is of the correct format, as will be readily understood by those skilled in the art. The magic number allows the server to detect various types of problems. For example, when parsing a data block stored in an arena, if the magic number does not appear at the expected location, the server knows that there is a problem, such as corrupted data or an incorrect index. In addition, if data corruption is detected, the server can scan through the data looking for the magic number. Once the server finds this number it can then attempt to parse the data.

The block header 308 further includes encoding and "esize" fields. Before storing a block in the log, an attempt is made to compress its contents. The inclusion of data compression increases the effective capacity of the archive and is simple to add given the log structure, although some blocks may be incompressible. The encoding field in the block header indicates whether the data was compressed and, if so, the particular compression algorithm used. The esize field indicates the size of the data after compression, thus allowing the location of the next block in the arena to be determined.

A drawback associated with the use of data compression is its significant computational cost, typically resulting in a decrease in the rate at which blocks can be stored and retrieved. The example implementation uses a Lempel-Ziv algorithm of the type described in J. Ziv and A. Lempel, "A universal algorithm for sequential data compression," IEEE Trans. Inform. Theory, Vol. IT-23, pp. 337–343, May 1977, which is incorporated by reference herein, although other compression algorithms can of course be used.

As indicated above, the basic operation of the server 104 is to store and retrieve data blocks based on their fingerprints or other substantially unique identifiers. A fingerprint generated using the above-described SHA-1 hash function is 160 bits long, and the number of possible fingerprints far exceeds the number of blocks to be stored on the server. The disparity between the number of fingerprints and the number of blocks means it is impractical in this illustrative embodiment to map the fingerprint directly to a location on a storage device, although such an arrangement may be used. Instead, the server uses an index to locate a block within the log. The index storage in server 104 is implemented using storage elements 112 and 114.

Figure 4:
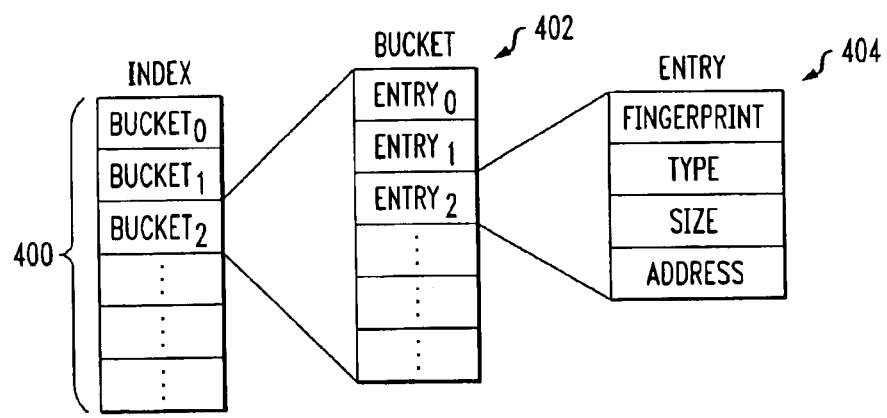

FIG. 4 shows an example index 400 in greater detail. The index 400, which may be implemented in the form of a disk-resident hash table, is divided into fixed-sized buckets, denoted $bucket_0$, $bucket_1$, $bucket_2$, etc., each of which may be stored as a single disk block. Each bucket contains the index map for a small section of the fingerprint space. More particularly, a given bucket 402 includes a number of entries, denoted $entry_0$, $entry_1$, $entry_2$, etc., and a given entry 404 includes fingerprint, type, size and address fields. A given bucket entry thus provides a mapping from a particular data block fingerprint to a corresponding address in the data log 300 as stored in data storage element 116 of server 104. A hash function may be used to map fingerprints to index buckets in a roughly uniform manner, and then the bucket may be examined using binary search. If provisioned with sufficient buckets, the index hash table will be relatively empty and bucket overflows will be extremely rare. If a bucket does overflow, the extra entries may be placed in an adjacent bucket. This structure is simple and efficient, requiring one disk access to locate the appropriate address for a block in almost all cases.

The hash function used to map fingerprints to index buckets can be as simple as selecting an appropriate number of bits from the 160 bit fingerprint. It simply needs to reduce 160 bits down to a value in the range of the number of buckets being used. Since the fingerprint is already random, the hash of the fingerprint can be very simple.

It should be understood that the particular index structure used in the illustrative embodiment is by way of example only. Although this example index structure has the advantage of simplicity, numerous other index structures could be used, as will be appreciated by those skilled in the art. Examples of alternative index structures include, without limitation, b-trees or expandable hash tables.

The performance penalty associated with use of the above-described index is reduced through the use of the block cache 110 and index cache 112 of FIG. 1. Each of these caches may be of approximately equal size. A "hit" in the block cache 110 returns the data for that fingerprint, bypassing the both the index lookup and access to the data log. Hits in the index cache 112 eliminate only the index lookup, but the entries are much smaller in this cache and the hit rate correspondingly higher.

The caches 110 and 112, however, do not speed up the process of storing a new data block to the server 104. The server must instead check that the data block to be stored is not a duplicate of a previously-stored data block by examining the index. Since the fingerprint of the data block in the illustrative embodiment contains no internal structure, the location of a fingerprint in the index is essentially random. The write performance of the server is therefore limited to the random access performance of the index 114, which for current technology is a few hundred accesses per second. A linear speedup in throughput can be achieved by striping the index across multiple disks, using techniques well-known to those skilled in the art. This requires a sufficient number of concurrent accesses, which can be provided by buffering the writes before accessing the index.

The server 104 in the above-described example implementation was configured using software code running on a dedicated dual 550 Mhz Pentium® III processor system with 2 Gbytes of memory and accessed over a 100 Mbs Ethernet network. The data log was stored on a 500 Gbyte MaxTronic IDE RAID 5 Array and the index was stored on a string of 8 Seagate Cheetah™ 18XL 9 Gbyte SCSI drives. Of course, these particular implementation details are provided by way of example only. Those skilled in the art will recognize that numerous alternative implementations are possible.

As noted above, the server 104 provides a mechanism by which client applications can direct the storage and retrieval of data blocks. Each application records the fingerprints of the data blocks it stores in the server for use in subsequent retrieval of those data blocks. In accordance with another aspect of the present invention, the fingerprints may be packed into additional blocks, called pointer blocks, that are also written to the server, a process that can be repeated recursively until a single fingerprint is obtained. This single fingerprint represents the root of a tree of blocks and corresponds to a hierarchical hash of the original data.

Figure 5:
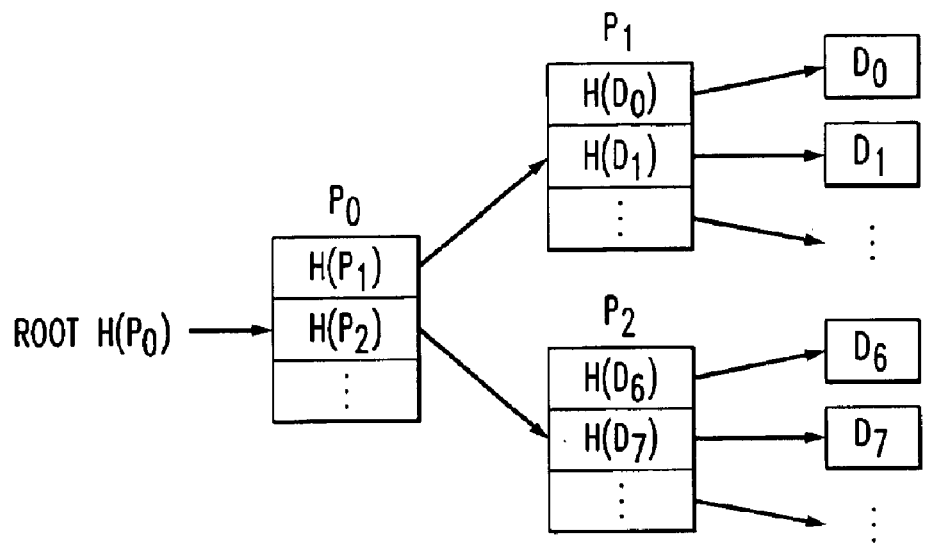
FIGS. 5 and 6 illustrate example tree structures for storing a linear sequence of blocks in the FIG. 1 network storage system in accordance with the techniques of the invention.
Figure 6:
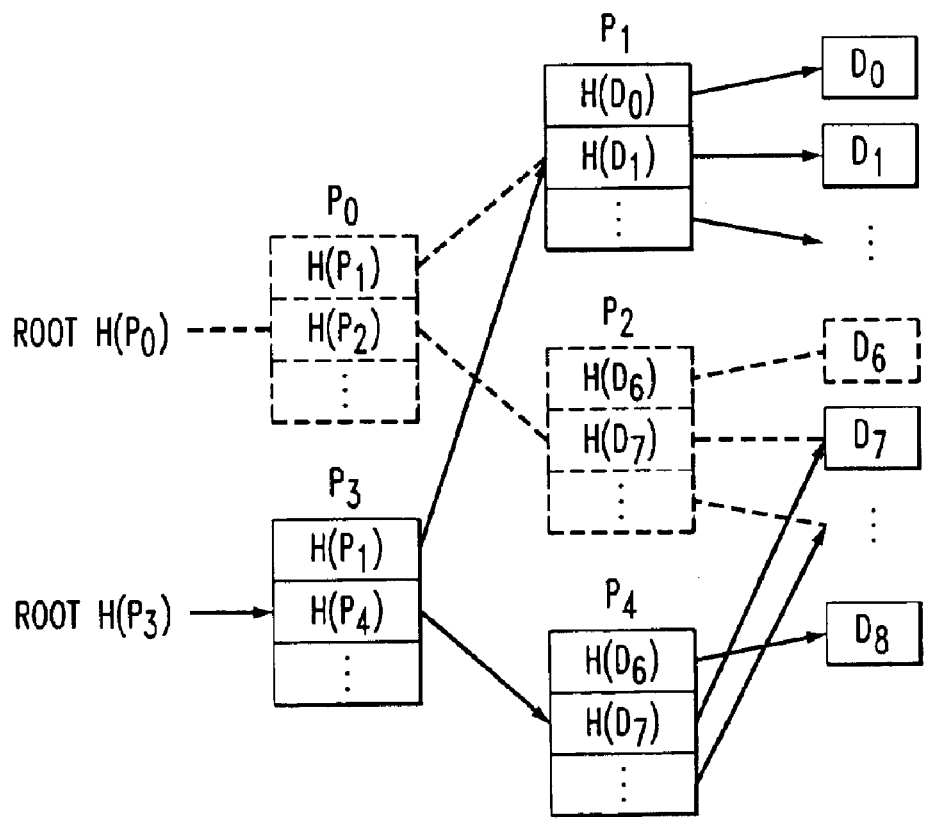

FIG. 5 shows a simple data structure for storing a linear sequence of data blocks $D_0$, $D_1$, ... $D_6$, $D_7$, etc. The data blocks are located via a fixed depth tree of pointer blocks $P_0$, $P_1$, $P_2$, etc. where the operation H( ) denotes the above-described application of a collision-resistant hash function to generate a fingerprint. The fixed depth tree is itself is addressed by a root fingerprint, denoted $H(P_0)$. Applications can use such a structure to store a single file or to mimic the behavior of a physical device such as a tape drive or a disk drive. The write-once nature of the server 104 does not allow such a tree to be modified, but new versions of the tree can be generated efficiently by storing the new or modified data blocks and reusing the unchanged sections of the tree. This generation of a new version of the tree is illustrated in FIG. 6.

By mixing data and fingerprints in a block, more complex data structures can be constructed. For example, a structure for storing a file system may include three types of blocks, namely, directory blocks, pointer blocks and data blocks. A directory block combines the meta information for a file and the fingerprint into a tree of data blocks containing the contents of the file. The depth of the tree can be determined from the size of the file, assuming the pointer and data blocks have a fixed size. Other structures can also be used, as will be apparent to those skilled in the art. The block-level interface provided by the server 104 in the illustrative embodiment leaves the choice of format to client applications, and different data structures can coexist on a single server.

A number of example applications that use the server 104 for archival data storage will now be described. These applications include a user-level archive utility referred to herein as vac, a physical-level backup utility, and a new version of the Plan 9 file system.

References to a server in the following description, and elsewhere herein, refer generally to server 104 unless otherwise indicated.

The vac user-level archive utility is an application for storing a collection of files and directories as a single object, similar in functionality to the well-known conventional utilities tar and zip. The vac utility in accordance with the techniques of the invention is configured to store the contents of selected files as a tree of blocks on the server. The root fingerprint for this tree is written to a vac archive file specified by the user, which in one implementation may comprise an ASCII representation of the 20 byte root fingerprint plus a fixed header string, and is always 45 bytes long. A corresponding program, called unvac, enables the user to restore files from a vac archive. Of course, unvac requires access to the server that contains the actual data, but in most situations this can be made transparent. For a user, it appears that vac compresses any amount of data down to 45 bytes. An important attribute of vac is that it writes each file as a separate collection of data blocks, thus ensuring that duplicate copies of a file will be coalesced on the server. If multiple users vac the same data, only one copy will be stored on the server. Similarly, a user may repeatedly vac a directory over time and even if the contents of the directory change, the additional storage consumed on the server will be related to the extent of the changes rather than the total size of the contents. Since the server coalesces data at the block level, even files that change may share many blocks with previous versions and thus require little space on the server. Log and database files are good examples of this scenario.

On many Unix systems, the dump utility is used to back up file systems. The dump utility has the ability to perform incremental backups of data. A user specifies a dump level, and only files that are new or have changed since the last dump at this level are written to the archive. To implement incremental backups, dump examines the modified time associated with each file, which is an efficient method of filtering out the unchanged files.

The above-described vac utility may also implement an incremental option based on the file modification times. The user specifies an existing vac file and this archive is used to reduce the number of blocks written to the server. For each file, vac examines the modified time in both the file system and the vac archive. If they are the same, vac copies the fingerprint for the file from the old archive into the new archive. Copying just the 20-byte fingerprint enables the new archive to include the entire file without reading the data from the file system or writing the data across the network to the server. In addition, unlike an incremental dump, the resulting archive will be identical to an archive generated without the incremental option, that is, the incremental option is only a performance improvement. This means there is no need to have multiple levels of backups, some incremental, some full, and so restore operations are greatly simplified.

A variant of the incremental option improves the backup of files without reference to modification times. As vac reads a file, it computes the fingerprint for each block. Concurrently, the pointer blocks of the old archive are examined to determine the fingerprint for the block at the same offset in the old version of the file. If the fingerprints are the same, the block does not need to be written to the server. Instead, the fingerprint can simply be copied into the appropriate pointer block. This optimization reduces the number of writes to the server, saving both network and disk bandwidth. As was the case with the file level optimization described above, the resulting vac file is no different from the one produced without this optimization. The optimization does, however, require the data for the file to be read and is only effective if there are a significant number of unchanged blocks.

The above-noted physical-level backup utility will now be described. Utilities such as vac, tar and dump archive data at the file or logical level, that is, they walk the file hierarchy converting both data and meta-data into their own internal format. An alternative approach is block-level or physical backup, in which the disk blocks that make up the file system are directly copied without interpretation. Physical backup has a number of benefits including simplicity and potentially much higher throughput, as described in N. C. Hutchinson et al., "Logical vs. physical file system backup," Proceedings of the 3rd USENIX Symposium on Operating Systems Design and Implementation (OSDI), 1999, which is incorporated by reference herein.

An advantageous application of the present invention is therefore a physical-level backup utility for one or more file systems, that stores the resulting data on the server. The simplest form of this type of physical backup is to copy the raw contents of one or mores disk drives to the server. The backup also includes a tree of pointer blocks, which enables access to the data blocks. As with the vac utility previously described, the end result is a single fingerprint representing the root of the tree. That fingerprint needs to be recorded outside of the server. Coalescing duplicate blocks is the main advantage of making a physical backup to the server rather than copying the data to another storage medium such as tape. Since file systems are inherently block based, it is expected that such coalescing will be effective. Not only will backups of a file system over time share many unchanged blocks, but even file systems for different machines that are running the same operating system may have many blocks in common. Also as with the vac utility, the user sees a full backup of the device, while retaining the storage space advantages of an incremental backup.

One enhancement to physical backup is to copy only blocks that are actively in use in the file system. For most file system formats it is relatively easy to determine if a block is in use or free without walking the file system hierarchy. Free blocks generally contain the remnants of temporary files that were created and removed in the time between backups and it is advantageous not to store such blocks. This optimization requires that the backup format be able to represent missing blocks, which can easily be achieved on the server by storing a null value for the appropriate entry in the pointer tree. The random access performance of the server is sufficiently good that it is possible to use a physical backup without first restoring it to disk. With operating system support, it is feasible to directly mount a backup file system image from the server. Access to this file system is read only, but it provides a natural method of restoring a subset of files. For situations where a full restore is required, it might be possible to do this restore in a lazy fashion, copying blocks from the server to the file system as needed, instead of copying the entire contents of the file system before resuming normal operation.

The time to perform a physical backup can be reduced using a variety of incremental techniques. Like the vac utility, the backup utility can compute the fingerprint of each block and compare this fingerprint with the appropriate entry in the pointer tree of a previous backup. This optimization reduces the number of writes to the server. If the file system provides information about which blocks have changed, as is the case with a number of conventional file systems, the backup utility can avoid even reading the unchanged blocks. Again, a major advantage of using the server 104 of the present invention is that the backup utility can implement these incremental techniques while still providing the user with a full backup. The backup utility writes the new blocks to the server and constructs a pointer tree with the appropriate fingerprint for the unchanged blocks.

As indicated previously, the server 104 can be used as the primary location for data rather than a place to store backups. A new version of the Plan 9 file system, to be described below, exemplifies this approach. In its conventional configuration, the Plan 9 file system is stored on a combination of magnetic disks and a write-once optical jukebox. The jukebox furnishes the permanent storage for the system, while the magnetic disks act as a cache for the jukebox. The cache provides faster file access and, more importantly, accumulates the changes to the file system during the period between snapshots. When a snapshot is taken, new or modified blocks are written from the disk cache to the jukebox. The disk cache can be smaller than the active file system, needing only to be big enough to contain the daily changes to the file system. However, accesses that miss the cache are significantly slower since changing platters in the jukebox takes several seconds. This performance penalty makes certain operations on old snapshots prohibitively expensive. Also, on the rare occasions when the disk cache has been reinitialized due to corruption, the file server spends several days filling the cache before performance returns to normal.

The new version of the Plan 9 file system configured in accordance with the techniques of the invention uses the server 104 instead of an optical jukebox as its storage device. Since the performance of the server is comparable to that of a disk, this substitution equalizes access both to the active view and to the archival view of the file system. It also allows the size of the disk cache to be reduced. The cache accumulates changes to the file system between snapshots, but does not speed file access.

A number of performance-related issues in the system 100 will now be addressed. For example, the system performance with regard to uncached sequential reads, which require a random read of the index 114, can be improved by using a form of read-ahead operation. When reading a block from the data log in data storage element 116, it is feasible to also read several following blocks. These extra blocks can be added to the caches 110, 112 without referencing the index 114. If blocks are read in the same order they were written to the log, the latency of uncached index lookups will be avoided. This strategy should work well for streaming data such as multimedia files.

Another aspect of the invention relates to tools that may be used for integrity checking and error recovery. Example uses of these tools include verifying the structure of an arena, checking there is an index entry for every block in the data log and vice versa, rebuilding the index from the data log, and copying an arena to removable media. These tools directly access the storage devices containing the data log and index and are executed on the server. The directory structure at the end of each arena enhances the efficiency of many integrity and recovery operations, since it is typically two orders of magnitude smaller than the arena, yet contains most of the needed information. The index checking utility, for example, may be implemented as a disk-based sort of all the arena directories, followed by a comparison between this sorted list and the index.

An additional integrity and recovery feature is provided by the association of a type identifier with every data block, as was described in conjunction with FIG. 3. This type identifier, which may be implemented as an 8-bit identifier, is preferably included with all client read and write operations and has the effect of partitioning the server into multiple independent domains. The idea is that the type identifier indicates the interpretation of the data contained in the block. A client can use this feature, for example, to indicate that a block is the root node for a tree of blocks. Currently, the data format associated with a given type identifier is left entirely to the client. The server does not interpret the type identifier other than to use it in conjunction with a fingerprint as the key with which to index a block. Another use of the type identifier is to assist the administrator in locating blocks for which a user has accidentally lost the fingerprint. Using a tool on the server, the data log can be scanned for blocks that match specified criteria, including the block type, the write time, and user identifier. The type identifier makes it relatively simple to locate forgotten root blocks. Other possible uses for the type identifier include providing the ability for the server to determine the location of fingerprints within a block, thereby enabling the server to traverse the data structures that have been stored.

In the example implementation described above, which stores the data log on a RAID 5 disk array, the server is protected against single drive failures. Additional protection could be obtained in a straightforward manner by using one or more off-site mirrors for the server, using techniques familiar to those skilled in the art. The architecture of the server makes this relatively simple, in that a background process on the server may copy new blocks from the data log to the mirrors. In this case, the server appears as another client to the mirror. If necessary, further protection can be provided through conventional low level enforcement of a write-once policy, or by copying the sealed arenas onto removable media.

As noted above, the server 104 may be distributed across multiple machines. The approach of identifying data by a hash of its contents simplifies such an extension. For example, the access performance could be improved by replicating the server and using a simple load balancing algorithm. When storing or retrieving a block, clients direct the operation to a server based on a few bits of the fingerprint. Such load balancing could even be hidden from the client application by interposing a proxy server that performs this operation on behalf of the client.

In the illustrative embodiment described above, the structures used for storing data on the server 104 break files into a series of fixed sized blocks. Identical blocks are consolidated on the server, but this consolidation will not occur if the data is shifted within the file or if an application uses a different block size. This limitation can be overcome using an adaptation of Manber's algorithm for finding similarities in files, as described in U. Manber, "Finding similar files in a large file system," Proceedings of the Winter 1994 USENIX Conference, San Francisco, Calif., January 1994, which is incorporated by reference herein. The idea is to break files into variable sized blocks based on the identification of anchor or break points, increasing the occurrence of duplicate blocks. See, for example, A. Muthitacharoen et al., "A low-bandwidth network file system," Proceedings of the 18th Symposium on Operating Systems Principles, October 2001, which is incorporated by reference herein. Such a strategy can be implemented in client applications with no change to the server.

The above-described embodiments of the invention are intended to be illustrative only. Numerous alternative embodiments within the scope of the appended claims will be readily apparent to those skilled in the art.

We claim:

1. A method of storing data in a storage system, the method comprising the steps of:
   processing a data block to generate an address which is determined as a function of the contents of the data block; and
   storing the data block in the system in a memory location identified by the address;
   wherein the processing and storing steps provide write-once storage of the data block in the system such that the contents of the data block are not modifiable without also altering the address of the data block determinable in the processing step.

2. The method of claim 1 wherein the processing and storing steps provide archival data storage of the data block.

3. The method of claim 1 wherein a request to store the data block is generated by a client device and the processing and storing steps are implemented in a server coupled to the client device.

4. The method of claim 3 wherein the server comprises a data block cache configured so as to permit retrieval of the data block from the server without requiring retrieval of the data block from the memory location corresponding to the address determined as a function of the contents of the data block.

5. The method of claim 3 wherein the server comprises an index cache configured so as to permit retrieval of the data block from the server without requiring a search through an index that specifies a mapping between a substantially unique identifier of the data block and the memory location address.

6. The method of claim 1 wherein the processing step further comprises determining a substantially unique identifier of the data block.

7. The method of claim 6 wherein the substantially unique identifier is determined by applying a collision-resistant hash function to the contents of the data block.

8. The method of claim 6 wherein the address is determined from the substantially unique identifier by utilizing the identifier to perform a lookup of the address in an index.

9. The method of claim 8 wherein the index comprises a plurality of buckets, each bucket comprising an index map for a portion of a space defined by possible values of the substantially unique identifiers, the index map having a plurality of entries each providing a mapping between a given one of the substantially unique identifiers and a corresponding memory location address in a storage element of the system.

10. The method of claim 9 wherein the substantially unique identifiers are distributed across the buckets in a substantially uniform manner by application of a hash function to the identifiers, the output of the hash function being used to determine a particular one of the buckets that will include an index map entry for the identifier.

11. The method of claim 6 wherein in conjunction with a request from a client device for retrieval of the stored data block, the client device and a server which stores the data block each recompute the substantially unique identifier from the contents of the retrieved data block in order to verify integrity of the retrieved data block.

12. The method of claim 1 further including the steps of detecting duplicate write operations for the given data block and then performing at least one of: (i) deleting one or more of said duplicate write operations; and (ii) combining said duplicate write operations into a single write operation.

13. The method of claim 1 wherein multiple client devices of the system write data blocks using the same block size and alignment.

14. The method of claim 1 wherein the storing step further comprises storing the data block in an append-only data log in a storage element of the system.

15. The method of claim 14 wherein the data log comprises a plurality of storage areas, each of the areas comprising a data block section in which data blocks are stored in an append-only manner.

16. The method of claim 15 wherein when a given one of the areas is filled, the area is marked as sealed, and a substantially unique identifier is computed for the contents of the area.

17. The method of claim 1 wherein the storing step comprises storing the data block at the memory location in a RAID device having a plurality of disk drives.

18. The method of claim 1 wherein the processing step further comprises forming a plurality of pointer blocks each comprising a plurality of substantially unique identifiers for a corresponding plurality of data blocks stored in the system, the pointer block itself being subject to the processing and storing steps in a recursive manner until a single unique identifier of a root of a tree of pointer blocks is obtained.

19. An apparatus for storing data in a storage system, the apparatus comprising:

a server having at least one processor coupled to a memory, the server being operative to process a data block to generate an address which is determined as a function of the contents of the data block, and to store the data block in the memory in a location identified by the address;

wherein the server is configured to provide write-once storage of the data block in the system such that the contents of the data block are not modifiable without also altering the address of the data block determinable as a function of the contents.

20. A machine-readable storage medium for storing one or more software programs for use in storing data in a storage system, the one or more software programs when executed in the system implementing the steps of:

processing a data block to generate an address which is determined as a function of the contents of the data block; and storing the data block in the system in a memory location identified by the address;

wherein the processing and storing steps provide write-once storage of the data block in the system such that the contents of the data block are not modifiable without also altering the address of the data block determinable in the processing step.

* * * * *